3,076,851
PROCESS FOR PREPARING PARA-t-ALKYL THIO-
PHENOLS USING $BF_3$-$H_3PO_4$ COMPLEX AS CATA-
LYST
Martin B. Neuworth, Pittsburgh, Pa., assignor to Consolidation Coal Company, Pittsburgh, Pa., a corporation of Pennsylvania
No Drawing. Filed Nov. 21, 1960, Ser. No. 70,443
19 Claims. (Cl. 260—609)

This invention relates to t-alkylated thiophenols and processes for preparing them. More particularly, it relates to a process whereby para-t-alkyl thiophenols are prepared by direct alkylation of a thiophenol in the presence of boron trifluoride-phosphoric acid complex as catalyst. This invention further relates to the preparation of t-alkyl aryl sulfides and their conversion to para-t-alkyl thiophenols in the presence of boron trifluoride-phosphoric acid complex as catalyst.

The problems involved in the direct alkylation of thiophenols are well known. As has been pointed out in U.S. Patent 2,753,378:

"In contrast with phenolic compounds, which are simply alkylated to produce alkyl phenols, previous efforts to alkylate thiophenols have resulted in alkylation exclusively of the sulfur atom with the resulting production of aryl alkyl sulfides. Since efforts to effect carbon alkylation of thiophenols in the past have resulted in the production of aryl alkyl sulfides, it has been necessary to resort to means such as zinc dust reduction of alkyl benzene sulfonyl chlorides, the reaction of diazotized alkaryl amines with hydrogen sulfide, catalytic hydrogenation of aryl sulfonic acids and the action of sulfur on Grignard reagents in order to produce alkyl-substituted thiophenols. In addition to the tendency towards thioether formation, attempted alkylation of thiophenols has also been complicated by the fact that common alkylating catalysts such as anhydrous aluminum chloride and concentrated sulfuric acids have tended to cause desulfurization and condensed ring formation at relatively mild operating conditions."

It has been reported in the prior art that thiophenols, including ortho- and meta-substituted alkyl thiophenols, can be directly alkylated in the para position by using a combination of a specific alkylating agent, namely, either a tertiary aliphatic alcohol or a tertiary aliphatic mercaptan, together with a specific catalyst, namely, an aluminum halide catalyst, e.g., aluminum chloride. Primary and secondary alcohols are considered unsuitable as alkylating agents in that sulfur-alkylated products are reported to be produced exclusively. In this method of the prior art using the specified t-alkylating agents, the ring-alkylated, i.e., C-alkylate product, is reported as being formed in a yield that is low compared with yields obtained by the process of this invention, with relatively large amounts of the sulfide, i.e., S-alkylate product, being formed. Further, the specific alkylating agent required with the process, i.e., the tertiary alcohol or tertiary mercaptan, is relatively more expensive than olefinic alkylating agents. In addition, relatively large amounts of the catalyst are required. Since an additional hydrolysis step is needed for recovery of the C-alkylate compound, the catalyst will ordinarily be consumed in the reaction or otherwise not recoverable.

It is accordingly an object of the present invention to provide a method, free from the disadvantages of known methods, for directly t-alkylating a thiophenol in the para position of the ring.

It is a further object to provide a method for t-alkylating a thiophenol to a C-alkylated thiophenol substantially free from S-alkylated products.

It is still a further object to provide a method for converting t-alkyl aryl sulfides to ring-alkylated thiophenols.

It is an additional object to provide t-alkylated thiophenols in high yield.

In accordance with this invention, an alkylatable thiophenol containing meta and para positions that are "free," i.e., unsubstituted by other than a hydrogen atom, is converted to a para-t-alkyl thiophenol in substantial yield by reacting it with a t-alkyl-generating monoolefinic alkylating agent under suitable ring alkylating conditions in the presence of boron trifluoride-phosphoric acid complex as catalyst so that there occurs substantial substitution by the tertiary alkyl group in the para position. The olefin used in the practice of this invention has one double bond per molecule and generates a tertiary alkyl substituent. Preferred olefinic alkylating agents are those which additionally contain from 4 to 12 carbon atoms.

Somewhat surprisingly, despite the potency of this catalyst and the sensitivity of thiophenols to degradation, the catalyst does not react with the thiophenol. This degradation reaction of a thiophenol will ordinarily occur at above room temperature in the absence of minimal amounts of olefin or its sulfide equivalent when using an alkylation catalyst such as aluminum chloride.

Further in accordance with this invention, any S-alkylate products formed during the alkylation reaction, e.g., sulfides, may be disproportionated or rearranged to form t-alkyl-substituted C-alkylate product by further heating of the S-alkylate product in the presence of the selected catalyst. Optionally, additional quantities of the starting thiophenol may be added. By either technique, all S-alkylate product may be converted to C-alkylate product. Effectively, then, the S-alkylate compound acts as an alkylating agent, either ring alkylating some of the added thiophenol or another sulfide molecule. At the same time, the S-alkylate product may undergo internal rearrangement to a C-alkylate product.

The terms "alkylation" or "alkylating" as used herein, unless otherwise indicated, are directed to the substitution of a tertiary alkyl hydrocarbon radical for a hydrogen atom in the para position of a thiophenolic compound. The term "C-alkylation" is specific to substitution in the ring, and "S-alkylation" refers to substitution of the hydrogen atom attached to the sulfur atom to form an alkyl aryl sulfide.

The alkylatable thiophenolic compounds that are employed as starting materials in the process of this invention contain hydrogen atoms in the meta positions in addition to containing a hydrogen atom in the para position with respect to the sulfhydryl or thiol group present on the benzene nucleus. Problems of steric hindrance will ordinarily occur when an attempt is made to substitute a group onto the ring in a position adjacent to another group already on the ring. Thus the presence of a methyl or other alkyl group in a meta position will prevent para-alkylation from occurring even though the para position is free, i.e., unsubstituted by other than hydrogen. Thiophenol homologs that may be advantageously employed in the process of this invention include, for example, o-thiocresol, o-ethylthiophenol, 2,6-thioxylenol, o-n-butylthiophenol, 2,6-diisopropylthiophenol, o-n-hexylthiophenol, and o-chlorothiophenol. In general, thiophenol itself and thiophenol substituted only by lower alkyl radicals ($C_1$ to $C_5$) are preferred as alkylatable starting materials. These preferred alkylatable thiophenols are unsubstituted by other than hydrogen in the 3, 4, and 5 positions on the ring.

In general, t-alkyl-generating unsaturated aliphatic hydrocarbons having from 4 to 12 carbon atoms, e.g., various olefins and polyolefins, are suitable and preferred for the practice of this invention. Particularly useful are terminal olefins of the type $R_1R_2C{=}CH_2$ where $R_1$ and $R_2$ are alkyl, especially where $R_1$ or $R_2$ is methyl or where $R_1$ and $R_2$ form a five- or six-membered ring. As the molecular weight of the olefin employed increases, yields of ring-alkylated product decrease. Also, when olefins of higher molecular weight are used, separation between the isomeric thiophenols and sulfides that are formed becomes more difficult because of the close and frequently overlapping boiling ranges of these products. The separation and recovery are particularly difficult to accomplish if low yields of ring-alkylated product are obtained. Suitable t-alkyl-generating olefinic alkylating agents that may be used for obtaining substitution in the para position of the ring include isobutylene, isoamylene, propylene trimer, and propylene tetramer.

It is considered an essential feature of this invention that boron trifluoride-phosphoric acid complex be used as catalyst together with a t-alkyl generating olefin to effect the direct ring-alkylation reaction in the para position. The catalyst is also used to effect the conversion of S-alkylate product to C-alkylate product, either in the presence or absence of additional amounts of a thiophenol. The catalyst of this invention is essentially an equimolar reaction product of boron trifluoride and phosphoric acid. This product is a clear amber-colored liquid.

It should be noted that while other so-called Friedel-Crafts or acid-type catalysts such as zinc chloride, antimony trichloride, antimony pentachloride, titanium tetrachloride, sulfuric acid, phosphoric acid, aluminum chloride sulfate ($AlCl_2 \cdot HSO_4$), and ferric chloride are extremely effective for ring-alkylating phenols, using catalyst concentrations as low as 0.2 percent by weight, these aforementioned other catalysts are essentially ineffective for the ring alkylation of thiophenols using t-alkyl-generating olefins or for converting S-alkylate compounds to C-alkylate ones. Thus for the alkylation of thiophenols, using olefins or sulfides as alkylating agents, so-called conventional alkylation catalysts are not substitutive for each other.

Temperatures between about 50 and 120° C. may be successfully employed in the practice of this invention. For obtaining substantial ring alkylation a temperature between about 75 and 100° C. is preferred. At temperatures below 75° C. conversion of the thiophenol falls off, and also the rate of C-alkylation becomes too slow, with S-alkylation predominating. At temperatures below 50° C., sulfide alkylation tends to become essentially exclusive. As the temperature is raised above 100° C., catalyst stability is deleteriously affected, the catalyst beginning to decompose at temperatures above 120° C. An amount of 8 to 12 percent of catalyst, based on the original weight of the thiophenol, is generally preferred for obtaining optimum yields. However, amounts of catalyst between 2 and 25 percent by weight are considered suitable depending upon specific reaction conditions.

Because of the marked liability of the sulfhydryl group of a thiophenol, general attempts at ring alkylation of the thiophenol have resulted heretofore in sulfide formation almost exclusively or in a splitting off of the sulfhydryl group from the ring. This dehydrosulfurization effect is particularly marked when an attempt is made to ring alkylate thiophenol or o-thiocresol with an olefin in the presence of an alkylation catalyst such as aluminum chloride. In copending application S.N. 70,405 of R. J. Laufer, filed of even date herewith, and assigned to the assignee of this invention, a specific technique has been discovered for preventing degradation of the thiophenol in the presence of an aluminum chloride catalyst while at the same time accomplishing substantial ring alkylation using a t-alkyl-generating olefin. Somewhat surprisingly, I have discovered that although the catalyst of this invention is highly effective, capable of giving substantial yields of ring-alkylated product when a thiophenol is alkylated with an olefin in its presence, it at no time degrades the thiophenol itself. Thus no special anti-degradation techniques of rapid addition of olefin or sulfide at low temperatures are required despite the potency of the catalyst used.

The catalyst of this invention is essentially an equimolar complex of boron trifluoride and phosphoric acid. As pointed out in my joint copending application, S.N. 70,413, filed of even date herewith, boron trifluoride is a catalyst that may be used to effect the ring alkylation of thiophenols. On the other hand, phosphoric acid is wholly ineffectual in this regard, only S-alkylation and no C-alkylation occurring. However, the catalyst used herein, namely, boron trifluoride-phosphoric acid complex, has been found to be significantly more effective than either boron trifluoride (or phosphoric acid) in giving a much more complete alkylation in the ring in a single pass of reactants through the system. At the same time, the high pressures required for effective use of gaseous boron trifluoride are not required for use with the boron trifluoride-phosphoric acid complex catalyst because of its liquid nature.

In addition, the catalyst used herein is insoluble in the alkylated thiophenol reaction products, and therefore may be readily recovered from the system by simple decantation and effectively reused. Reuse of boron trifluoride is ordinarily impracticable because recovery of a gas from a pressurized system is difficult, and separation of the gas from other evolved gases may be required. Recovery of aluminum chloride from the reactant system is not feasible because of its ready solubility in the thiophenols; this catalyst ordinarily is destroyed during the subsequent hydrolysis step and therefore cannot be recovered for reuse. Thus the catalyst of this invention is uniquely adapted to the ring alkylation of thiophenols because of its greater potency in effecting ring alkylation with a t-alkyl olefin, the absence of high pressure requirements, its ready recovery and reuse, and the complete absence of any splitting effect on the sulfhydryl group of the thiophenol.

A catalyst prepared from 85 percent phosphoric acid, i.e., containing 15 weight percent water, the phosphoric acid of commerce, will effectively promote ring alkylation of a thiophenol. However, it has been uniquely found that optimum results are obtained in the ring alkylation of a thiophenol when the catalyst is prepared starting with 100 percent phosphoric acid. Using this latter catalyst, considerably higher yields of ring-alkylated thiophenol are obtained.

The liquid catalyst used in the practice of this invention may be prepared by various methods known to the art. Thus the catalyst may be conveniently prepared by bubbling boron trifluoride gas through 100 percent phosphoric acid. An equimolar complex results which begins to decompose at temperatures above 120° C. If a deficiency of boron trifluoride gas is used, then free phosphoric acid is associated with the catalyst complex. If an excess of boron trifluoride gas is added, under pressurized conditions, the gas will go into solution in the complex, and subsequently be evolved from the liquid upon release of pressure. If 85 percent phosphoric acid is used, water will be present in the final complex.

The process disclosed herein is particularly advantageous for commercial exploitation inasmuch as the alkylated thiophenol may be completely converted to the para-C-alkylate product with no S-alkylate product present. Thus when an alkylatable thiophenol containing hydrogen atoms in meta and para positions is alkylated in accordance with this invention, para C-alkylate and S-alkylate products are formed. Means have now been provided, without basically changing the reactants or catalyst system employed, for further converting the S-alkylate products to the para C-alkylate products. This is accomplished by reacting the sulfides per se or with additional portions of the starting thiophenol in the presence of boron trifluoride-phosphoric acid complex as catalyst. Furthermore, where t-alkyl aryl sulfides are used as starting materials, independent of how produced, means have now been provided for converting them to ring-alkylated thiophenols while simultaneously using them as ring-alkylating agents for sulfides or thiophenols present. The alkyl group must be a t-alkyl group in order to be directed to the para position.

In general, in the direct alkylation step, using an olefin rather thn an alkyl aryl sulfide as alkylating agent, if less than a mole of alkylating agent per mole of alkylatable thiophenol is used, increased formation of the C-alkylate product is favored. A molar ratio of 0.75 to 1 of alkylating agent to thiophenol is preferred for this purpose, a ratio of 0.80 being considered optimal. If the ratio falls below 0.75, total conversion of thiophenol decreases. If the ratio rises above 1, i.e., above equimolar quantities of the reactants, total conversion may increase, but formation of alkyl alkaryl sulfide may be promoted at the expense of the C-alkyl thiophenol. In addition, the use of large excesses of olefin and long reaction times does not usually give improved conversions, but rather leads to undesired side reactions such as the formation of high-boiling materials, possibly derived from olefin polymers. At reaction times below an hour, at a temperature of 80° C., both conversion of thiophenol and yield of C-alkyl product tend to decrease.

The S-alkylate product generally consists of the t-alkyl aryl sulfide and also of the t-alkyl p-t-alkaryl sulfide. The formation of the latter sulfide is favored when a molar excess of alkylating agent is used. The conversion of the sulfides may be carried out at atmospheric pressure or at greater than atmospheric pressure and at a temperature between about 50 and 120° C. A temperature between about 75 and 100° C. is considered optimal. Lower temperatures require correspondingly greater reaction times to provide comparable conversions and yields. The catalyst present may vary from 2 to 25 percent by weight of the thiophenol added. Amounts from 8 to 12 percent are preferred. Where the catalyst concentration is too low, both the total conversion and the yield of C-alkyl product fall off.

Without being restricted by the reaction mechanism to be suggested, it is believed that reaction of the t-alkyl aryl sulfide under alkylating conditions primarily results in the isomerization of the sulfide both on an inter- and intramolecular basis. That is, the t-alkyl group attached to the sulfur atom may migrate to the para position of the added thiophenol or sulfide, or, less likely, to the para position of its own molecule, where this position is free. Thereby the C-alkylate derivative is formed. Although thiophenol may be added to the alkyl aryl sulfide, the isomerization can occur wholly independent of the amount of any added thiophenol (Reaction 2).

In reactions involving the isomerization of a preformed t-alkyl aryl sulfide, best results are obtained by heating the pure sulfide with the catalyst in the absence of any added thiophenol. These conditions correspond to an olefin to thiophenol ratio of unity. In the disproportionation of alkyl alkaryl sulfides, equimolar quantities of the sulfide and of the unalkylated thiophenol are considered to yield optimum results.

In general, the assumption is made that one mole of a t-alkyl sulfide in the reaction mixture is equivalent to one mole of the corresponding olefin since the tertiary alkyl aryl sulfides function as nuclear alkylating agents. Mechanistically, they may be formed as major intermediates in the direct olefin t-alkylation of thiophenols.

Depending upon specific reaction conditions with respect to temperature and proportions of the specific olefin and thiophenol used, a reaction time of as little as half an hour may be employed. In general, reaction times between 2 and 4 hours are preferred. Under optimum conditions of temperature and of catalyst concentration, as well as optimum olefin to thiophenol ratio, an increase in the reaction time beyond 3 to 6 hours (after addition of the olefin and after attainment of selected reaction temperature), will ordinarily give little increase in the yield of the t-alkyl thiophenol at the expense of the by-product sulfides. In general, the products approach an equilibrium distribution after 3 hours at 80° C.

Thiophenol and o-alkyl-substituted thiophenols may be directly alkylated in the para position of the ring in accordance with this invention using a t-alkyl-generating olefin or a t-alkyl aryl sulfide as alkylating agent. Where the para position of the thiophenol is substituted, no t-alkylation has been found to occur anywhere on the ring even where the ortho and meta positions are free. For example, when a mixture of the three isomeric thiocresols was reacted with isobutylene in the presence of 10 percent by weight of boron trifluoride-phosphoric acid complex, based on the thiocresols, almost complete conversion of the o-thiocresol was obtained, with more than 70 percent of the converted material being t-butyl-o-thiocresol. By contrast, the meta- and para-thiocresols are recovered unreacted or as their t-butyl sulfides. No ring alkylation occurs. No degradation of thiocresol occurs.

The alkylated thiophenols, both C-alkylated and S-alkylated, find a variety of uses. Several of these compounds or their metallic salts are of interest as lubricating oil additives because of their antioxidant and detergent properties. As antioxidants, they serve to prevent resin formation in fuels; condensed to form thioacetals, they are particularly suited as additives for high-pressure lubricating oils; they are also useful as additives for metal cleaners to protect the metal from atmospheric attack; they also protect drying oils, such as linseed oil, from darkening and oxidation; they have also been used to stabilize preparations of adrenalin and other hormones. Various of the S-alkylate compounds, e.g., t-butyl p-t-butylphenyl sulfide, nonyl phenyl sulfide, and nonyl p-nonylphenyl sulfide, are seen as possessing useful insecticidal properties in addition to being useful as ready sources for the production of the corresponding thiophenols.

In addition, compounds such as the p-t-butylthiophenols are particularly useful as substantially odorless rubber peptizers. Thus, while o-thiocresol possesses peptizing properties, compounds such as 4-t-butyl-o-thiocresol and 4-t-butyl-2,6-thioxylenol may be used as rubber peptizers, and at the same time are free from the sickeningly repugnant odor characterizing o-thiocresol. A higher molecular weight compound such as p-nonylthiophenol is seen as affording similar peptizing advantages in this regard. The metal salt or phosphate ester of p-nonylthiophenol is considered suitable as an antioxidant lubricating oil additive.

The following reactions, shown schematically and not stoichiometrically, illustrate the manner in which conversion of thiophenol to p-t-butylthiophenol may be obtained.

REACTION 1.—DIRECT t-BUTYLATION OF THIOPHENOL

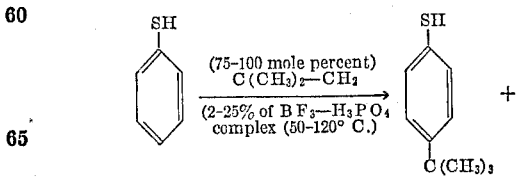

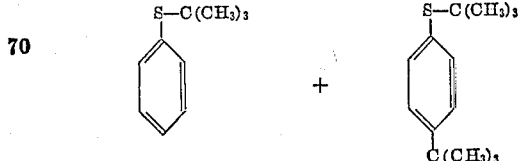

REACTION 2.—ISOMERIZATION OF t-BUTYL PHENYL SULFIDE

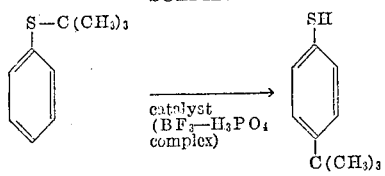

REACTION 3.—DISPROPORTIONATION OF t-BUTYL p-t-BUTYL PHENYL SULFIDE

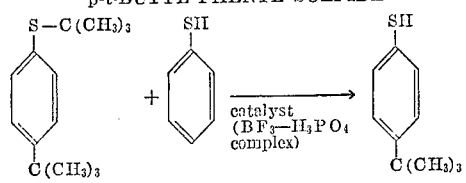

It is noted that in accordance with the above three reactions, the final product obtained is either p-t-butylthiophenol or convertible thereto. Thereby complete conversion of thiophenol to p-t-butylthiophenol may be obtained. Also, no special precautions need be taken to avoid degradation of the thiophenol.

The process of this invention is advantageously employed to prepare para-t-butyl thiophenols directly from thiophenol or its homologs. Typical C-alkylate and S-alkylate products that may be formed by direct butylation of thiophenol are the following:

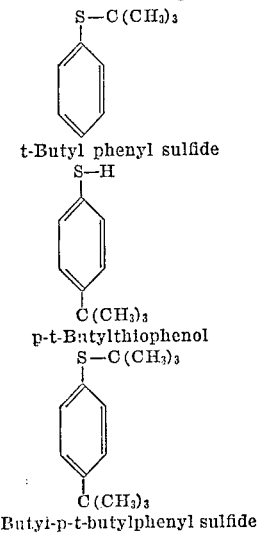

For purposes of illustration, without limiting the scope of this invention, the process of the invention will be particularly described with reference to the conversion of thiophenol and o-thiocresol to p-t-butyl-thiophenol and p-t-butyl-o-thiocresol, respectively.

Example 1
PREPARATION OF BF₃—H₃PO₄ CATALYST

A two-liter three-neck round bottom reaction flask equipped with a sealed stirrer, thermometer, gas inlet tube and gas outlet tube connected to a water scrubber was used. The boron trifluoride flow was metered, traps being employed to prevent back flow of liquids into the reaction flask. Polyethylene tubing was used for the various connections. This apparatus was used both for the catalyst preparation and for the alkylation reactions.

One hundred percent phosphoric acid was prepared by placing 85 percent $H_3PO_4$ (255 g.) into the reaction flask. Then $P_2O_5$ (99 g.) was added slowly to the vigorously stirred and cooled phosphoric acid at a rate so as to maintain the temperature below 85° C. Approximately 15 minutes was required for the $P_2O_5$ addition. The resultant 100% $H_3PO_4$ liquid was colorless and clear.

While vigorously stirring the 100% $H_3PO_4$, 246 g. of boron trifluoride ($H_3PO_4$ to $BF_3$ mole ratio of 1.0) was passed into the reaction flask at a rate of 2 grams per minute. At this boron trifluoride feed rate, the temperature leveled off at 55° C. No special cooling in the flask was therefore necessary to maintain the temperature below 120° C., at which temperature the $$BF_3—H_3PO_4$$

complex becomes unstable and begins to dissociate. The product $BF_3—H_3PO_4$ was a viscous light amber-colored liquid which fumed strongly when exposed to air. After cooling to room temperature, the complex was transferred to a glass-stoppered bottle and stored without any apparent gas pressure. This catalyst was used in all of the following examples unless otherwise specified.

Example 2
BUTYLATION OF MIXED THIOCRESOLS

Two thousand grams of mixed thiocresols (phenol free) were charged into a 5-liter flask followed by 200 g. of $H_3PO_4$—$BF_3$ catalyst. The temperature was raised to 60° C., and while maintaining vigorous stirring 720 grams of isobutylene (isobutylene/thiocresol mole ratio of 0.8) was charged at a rate of 9 g./min. The temperature was allowed to rise to 80° C. (exothermic reaction). After addition of the isobutylene was complete, the product was stirred for 3.5 hours at 80° C. Following this reaction period, the product was poured into a nitrogen-filled separatory funnel, and the catalyst, orange-red in color, was drawn off as a lower liquid phase, weighing 228 g. The supernatant liquid, protected by a nitrogen atmosphere, was neutralized with 5% $NaHCO_3$ (only 5–10 ml. required for neutralization), washed with 2000 ml. of water, decanted, and weighed (2680 g.). The crude reaction mixture was distilled through a ¾ in. x 4 ft. Cannon packed column.

The butylation of mixed thiocresols with isobutylene in the presence of $H_3PO_4$—$BF_3$ catalyst at 80° C. appears as a clean-cut reaction selectively ring butylating only the o-thiocresol. The formation of 4-t-butyl-o-thiocresol is favored, accompanied by about 18% of the sulfide of o-thiocresol as the t-butyl 4-t-butyl-o-tolyl sulfide. The t-butyl-tolyl sulfides are derived almost entirely from the m-p-thiocresols, as shown in Table I. The unreacted thiocresols contain about 5% of the ortho isomer. However, this may be reduced by increasing the isobutylene to thiocresol ratio. The reaction products can be easily separated by fractional distillation since the boiling point difference of the various components varies from 18° to 35° C. Also, the alkylation catalyst may be recycled for several cycles. The foregoing results are summarized in Table I.

TABLE I.—BUTYLATION OF MIXED THIOCRESOLS

Conditions: Isobutylene/thiocresol mole ratio, 0.8. Catalyst concentration: 10 weight percent $BF_3$—$H_3PO_4$ (based on thiocresols charged); 80° C.; 3.5 hours

| Feed composition (percent by weight thiocresols) | | Thiocresols converted (percent by weight) | Product yield (mole percent based on corresponding thiocresol isomer converted) | | |
|---|---|---|---|---|---|
| | | | 4-t-butyl-o-thiocresol | t-butyl tolyl sulfide | t-Butyl p-t-butyl-o-tolyl sulfide |
| Thiocresols | 100.0 | 70.0 | | 42.0 | |
| Ortho | 36.9 | 95.6 | 87.4 | 1.8 | 10.9 |
| Meta | 46.9 | 51.7 | | 82.0 | |
| Para | 16.2 | 64.8 | | 85.7 | |

Example 3
BUTYLATION OF THIOPHENOL

The general procedure used for Example 2 was followed. The catalyst was prepared from 100 percent phosphoric acid, as described under Example 1, and was used in a concentration of 10 percent by weight of the thiophenol. The mole ratio of olefin to thiophenol was maintained at 0.8. The reaction was maintained at a temperature of 80° C. for 5 hours.

Approximately 68.5 percent of the thiophenol was converted, with no degradation of thiophenol occurring. The following results were obtained.

Yield: Mole percent of converted thiophenol
- 4-t-butylthiophenol _____ 78.4
- t-Butyl phenyl sulfide_____ 5.7
- p-t-Butyl t-butylphenyl sulfide_____ 11.5
- Residue _____ 4.4

Example 4
PREPARATION AND RECOVERY OF 4-NONYLTHIOPHENOL

The general procedure used for Example 2 was followed.

The reaction conditions used were as follows: mole ratio of nonene (propylene trimer) to thiophenol, 0.5; catalyst concentration (wt. percent thiophenol), 20; temperature, 80° C.; time of reaction, 5 hours.

The following results were obtained (based on a thiophenol conversion of 43.0%).

Yield: Mole percent of converted thiophenol
- p-t-Nonylthiophenol _____ 51.1
- t-Nonyl phenyl sulfide _____ 40.6
- t-Nonyl p-t-nonylphenyl sulfide _____ 8.3

In order to recover nonylthiophenol from the reaction system, it must be separated from nonylphenyl sulfide that is also formed. Both compounds have identical molecular weights, are closely related structurally, and boil within a few degrees of one another. An attempt to separate the two compounds by fine fractionation by distillation was unsatisfactory because a series of mixtures of the nonylthiophenol and nonylphenyl sulfide resulted due to codistillation. However, because of the relatively high yield of nonylthiophenol that is obtainable using the $BF_3$—$H_3PO_4$ catalyst, recovery of about half of the nonylthiophenol as a higher boiling fraction was feasible in a purity of 96%.

It was further found that separation of nonylthiophenol from nonylphenyl sulfide by means of aqueous caustic extraction, which is satisfactorily employed for the lower alkyl thiophenols, was inoperable because of the formation of inseparable emulsions as a result of the surfactant properties of the nonylthiophenol. Attempted addition of hydrocarbon solvents to the aqueous caustic to promote phase separation was of little value since these solvents were incorporated within the emulsion. Also, it was found that attempted partitioning of the mixture of sulfide and thiophenol between hexane and ammonium hydroxide failed to produce any separation because of the insolubility of the high molecular weight alkylated thiophenol in the aqueous phase.

However, it was found that, in place of aqueous caustic extraction, the use of sodium or potassium hydroxide dissolved in aqueous methanol was highly effective in separating nonylthiophenol from nonylphenyl sulfide. Emulsion formation is minimized with fairly rapid phase separation occurring. Any traces of sulfide dissolved in the caustic extract can be removed by washing with hexane. A preferred caustic aqueous methanol solution for ready separation contains from 35 to 65 weight percent methanol, from 20 to 50 weight percent water, and from 10 to 20 weight percent sodium hydroxide or potassium hydroxide (all percentages by weight of solution). A paraffinic naphtha solvent such as hexane can be added prior to caustic extraction if desired, equally rapid phase separation occurring on subsequent contacting of the thiophenol-sulfide mixture with methanol and caustic.

After the caustic extract is washed with hexane, the nonylthiophenol is sprung from solution by treatment with mineral acid, e.g., hydrochloric, sulfuric, or phosphoric. The nonylthiiphenol is diluted with water to eliminate possible occlusion in precipitated inorganic salts and then decanted from solution. Methanol can be recovered from the dilute methanol solution by distillation.

The hexane extract, containing sulfides, is distilled to recover hexane.

Using the foregoing refining scheme, the nonylthiophenol was obtained in a purity of 98.5 percent.

Example 5
DODECYLATION OF THIOPHENOL

Dodecene (propylene tetramer) was used as alkylating agent under the same reaction conditions as reported in Example 4 for the preparation of 4-nonylthiophenol.

The following results were obtained (based on a thiophenol conversion of 44.0%).

Yield: Mole percent of converted thiophenol
- p-t-Dodecylthiophenol _____ [1] 39.3
- t-Dodecyl phenyl sulfide _____ 50.6
- t-Dodecyl p-t-dodecylphenyl sulfide _____ 10.1

[1] Contained slight amounts of 4-nonylthiophenol because of presence of some nonene in the dodecene.

The technique used for separating the dodecylthiophenol from the dodecyl phenyl sulfide was identical with that reported in Example 4, namely, that of caustic aqueous methanol extraction. The dodecylthiophenol was obtained in 100 percent purity, i.e., completely free from sulfide as determined by thiophenol titration.

Example 6
BUTYLATION OF MIXED THIOCRESOLS USING $BF_3$—$H_3PO_4$ (85%) CATALYST The catalyst used for this butylation reaction was prepared by reacting equimolar stoichiometric amounts of $BF_3$ and 85 percent $H_3PO_4$. The isobutylene to thiocresol molar ratio was 0.8 (1340 grams isobutylene/3720 grams thiocresols). The catalyst concentration was approximately 10 percent by weight of the thiocresols (370 grams). The isobutylene was added at a temperature between 22 and 36° C. for 50 minutes, using external cooling, with the final temperature rising to 76° C. The temperature was brought to 87° C. in 42 minutes and maintained at 73–87° C. for 5 hours with continuous stirring. The reaction mixture was then cooled. The catalyst was recovered (355 grams) as a bottom layer. The organic phase was washed with water and sodium bicarbonate, azeotropically dried with toluene, and distilled.

The isomer composition of the thiocresols initially used consisted of 39.3 percent ortho, 43.9 percent meta, and 16.4 percent para. The following products were obtained. Unreacted thiocresols (1211 grams): 440 grams ortho, 602 grams meta, and 169 grams para. t-Butyl tolyl sulfide (2301 grams): 326 grams ortho, 1436 grams meta, and 539 grams para. 4-t-Butyl-o-thiocresol: 728 grams; t-butyl 4-t-butyl-o-tolyl sulfide: 644 grams. The data obtained are summarized in Table II.

TABLE II.—BUTYLATION OF THIOCRESOLS USING $BF_3$—85% $H_3PO_4$ CATALYST

Conditions: Isobutylene/thiocresol molar ratio, 0.8. Catalyst concentration: 10% weight percent $BF_3$—85% $H_3PO_4$ (based on thiocresols charged), 73–87° C.; 5 hours.

| Feed composition (percent by weight thiocresols) | | Thiocresols converted (percent by weight) | Product yield (mole percent based on corresponding thiocresol isomer converted) | | |
|---|---|---|---|---|---|
| | | | 4-t-butyl-o-thiocresol | t-Butyl tolyl sulfides | t-Butyl 4-t-butyl-o-tolyl sulfide |
| Thiocresols | 99.6 | 67.2 | | 64.0 | |
| Ortho | 39.3 | 69.8 | 49.2 | 21.8 | 33.0 |
| Meta | 43.9 | 63.1 | | 96.8 | |
| Para | 16.4 | 72.2 | | 84.5 | |

As may be noted from Table II, substantial conversion of thiocresols and a relatively high yield of 4-t-butyl-o-thiocresol was obtained. Nonetheless, both the conversion of o-thiocresol and the yield of 4-t-butyl-o-thiocresol are significantly lower than is obtainable using a catalyst formed from the reaction of $BF_3$ with 100% phosphoric acid (Table I). The high selectivity in yield of ring-alkylated product using the latter catalyst is particularly marked.

*Example 7*

BUTYLATION OF MIXED THIOCRESOLS—EFFECT OF VARYING PARAMETERS

The butylation of mixed thiocresols was studied under varying conditions of catalyst concentration, catalyst life, reaction temperature, residence time, and isobutylene to thiocresol ratio. Under preferred reaction conditions: temperature between 80 and 100° C., 10 percent $BF_3$—$H_3PO_4$ catalyst (2 passes), and 0.9 molar isobutylene to thiocresol ratio, about 96 percent of the o-thiocresol was butylated with 69 percent being converted to 4-t-butyl-o-thiocresol and 27 percent to t-butyl 4-t-butyl-o-tolyl sulfide. This latter sulfide may be readily recycled for conversion to additional 4-t-butyl-o-thiocresol.

(a) *General procedure.*—Highly purified (99%+) mixed thiocresols (2000 grams) were placed in a 6-liter autoclave alone with the desired amount of catalyst. The mixture was raised to reaction temperature and controlled at temperature while the isobutylene was added. At the end of the scheduled reaction period, agitation was stopped and the heavier catalyst phase separated sharply from the reaction product. After the catalyst was removed, the reaction products were washed with 10 percent sodium bicarbonate until both the spent wash and the wash products were basic. The recovered catalyst was suitable for subsequent reuse.

(b) *Effect of temperature.*—Isobutylene and the mixed thiocresols (containing 37.5 percent o-thiocresol) were reacted at a molar ratio of isobutylene to o-thiocresol of 0.9 at a catalyst concentration by weight of o-thiocresol of 10 percent. The reaction time was 3.5 hours. At a temperature of 80° C., 99.3 percent of the o-thiocresol was converted, of which 67.0 percent was 4-t-butyl-o-thiocresol (run 3, Table III). At a temperature of 100° C., 99.5 percent of the o-thiocresol was converted, of which 74.2 percent was 4-t-butyl-o-thiocresol (run 5, Table III). However, if the temperature is raised substantially above 120° C., the catalyst tends to become unstable.

(c) *Effect of isobutylene to o-thiocresol molar ratio.*—The isobutylene to thiocresol molar ratio was varied between 0.5 and 1.3 while maintaining the catalyst concentration at 10 percent by weight of o-thiocresol, the reaction temperature at 80° C., and the time of reaction at 3.5 hours. At a molar ratio of 0.5, 85.2 percent of the o-thiocresol was converted, with a 90.4 percent yield of 4-t-butyl-o-thiocresol, based on converted material. At a 0.9 molar ratio, the conversion of o-thiocresol was 99.3 percent, with a yield based on converted material of 67.0 percent 4-t-butyl-o-thiocresol. At a molar ratio of isobutylene to thiocresol of 1.3, 100.0 percent conversion was obtained, with a yield of 4-t-butyl-ortho-thiocresol of 53.3 percent. Thus at lower isobutylene to thiocresol ratios, total conversion is low, but a greater proportion of 4-t-butyl-o-thiocresol is selectively produced; higher ratios give higher total conversion, but less selectivity. Hence to minimize undue recycling of sulfide, where complete conversion of o-thiocresol to 4-t-butyl-o-thiocresol is desired, a molar ratio between 0.5 and 0.9 appears optimal.

(d) *Effect of reaction time.*—Inasmuch as virtually complete conversion of o-thiocresol is obtained in 3.5 hours at 80° C., longer reaction times were considered as unnecessary. For a reaction time of 1.1 hours, the total conversion fell to 78 percent, and the yield of 4-t-butyl-o-thiocresol, based on converted material, fell to 62.3 percent. Thus decreasing the residence time decreased both the total conversion as well as the yield of 4-t-butyl-o-thiocresol obtained from the converted material.

(e) *Catalyst concentration and life.*—The reaction was evaluated at catalyst concentrations of 2, 5, 10, and 15 percent by weight of o-thiocresol charged. At a catalyst concentration of 2 percent by weight, only 27.8 percent of the o-thiocresol was converted; the yield obtained of 4-t-butyl-o-thiocresol based on converted material was 28.8 percent. At a catalyst concentration of 5 percent, corresponding conversions and yields were 91.8 and 65.0 percent. At catalyst concentrations of 10 percent by weight and higher, increase in catalyst concentration did not result in any marked increase in conversion or yield. The results are shown in Table III, runs 1-4.

Because the catalyst is readily recoverable from the reaction system, reuse of catalyst was evaluated for a total of four passes at a catalyst concentration of 10 percent by weight. Conversion on the second pass was good compared with the first pass; but for the third and fourth passes, while significant, the trend was toward lower conversions and less selectivity, i.e., less of the o-thiocresol converted appeared as 4-t-butyl-o-thiocresol and more appeared as a sulfide. The results obtained for catalyst reuse are shown in runs 6-8 of Table III.

TABLE III.—BUTYLATION OF MIXED THIOCRESOLS

| Run No | 1 | 2 | 3 | 4 | 5 | 6 | 7 | 8 |
|---|---|---|---|---|---|---|---|---|
| Catalyst concn., weight percent $BF_3$-$H_3PO_4$ | 2.0 | 5.0 | 10.0 | 15.0 | 10.0 | [2]10.0 | [3]10.0 | [4]10.0 |
| Temp., ° C | 80 | 80 | 80 | 80 | 100 | 80 | 80 | 80 |
| Ratio, moles isobutylene/moles o-thiocresol | 0.9 | 0.9 | 0.9 | 0.9 | 0.9 | 0.9 | 0.9 | 0.9 |
| Run time, hrs | 3.5 | 3.5 | 3.5 | 3.5 | 3.5 | 3.5 | 3.5 | 3.5 |
| Conversion of o-thiocresol, mole percent [1] | 27.8 | 91.8 | 99.3 | 99.5 | 99.5 | 93.9 | 89.6 | 75.8 |
| Conversion of o-thiocresol to 4-t-butyl-o-thiocresol, mole percent [1] | 8.0 | 59.7 | 66.5 | 70.3 | 73.9 | 64.5 | 45.1 | 44.9 |
| Yield of 4-t-butyl-o-thiocresol, mole percent (based on o-thiocresol converted) | 28.8 | 65.0 | 67.0 | 70.7 | 74.2 | 68.9 | 50.4 | 59.2 |
| Product distribution (solvent free): | | | | | | | | |
| Thiocresol (unreacted) | 14.3 | 18.4 | 18.5 | 19.1 | 20.6 | 19.3 | 12.4 | 18.7 |
| m,p-Thiocresol butyl sulfides | 71.5 | 40.8 | 37.5 | 37.1 | 23.0 | 38.6 | 47.3 | 46.6 |
| 4-t-butyl-o-thiocresol | 3.0 | 23.3 | 27.8 | 27.4 | 27.5 | 25.2 | 16.9 | 17.3 |
| t-Butyl 4-t-butyl-o-tolyl sulfide | 10.0 | 16.2 | 14.3 | 15.0 | 12.6 | 15.0 | 21.9 | 15.5 |
| High boiling material | | | | | 15.2 | | 0.5 | 0.8 |
| Residue | 1.2 | 1.3 | 1.9 | 1.4 | 1.1 | 1.9 | 1.0 | 1.1 |

[1] Based on 37.5% o-thiocresol in feed.
[2] Catalyst used once before.
[3] Approximate concentration; catalyst used twice before.
[4] Approximate concentration; catalyst used three times before.

*Example 8*

DISPROPORTIONATION—ISOMERIZATION OF ALKYL ARYL SULFIDES (a) t-Butyl phenyl sulfide (166.0 g.; 1.0 mole) was reacted in the presence of 11.5 g. of boron trifluoride-phosphoric acid complex (100% phosphoric acid used in preparing catalyst). Reaction conditions: 25-78° C. for 35 minutes, followed by 78-82° C. for 4 hours. The following products were recovered:

| Recovered | Grams | Gram-moles |
|---|---|---|
| Thiophenol | 20.7 | 0.188 |
| t-Butyl phenyl sulfide | 9.0 | 0.054 |
| p-t-Butylthiophenol | 91.8 | 0.552 |
| t-Butyl p-t-butylphenyl sulfide | 37.3 | 0.163 |
| Residue and others | 1.2 | |

Losses, residue and others, 3.8%.

It is noted that almost 95 percent of the starting t-butyl phenyl sulfide was converted. The molar yield of ring-alkylated thiophenol based on converted material was 59 percent.

(b) In another experiment, 166.0 g. (1.0 mole) of t-butyl phenyl sulfide was reacted with 55.0 g. (0.5 mole) of thiophenol in the presence of 11.5 g. of 100% boron-trifluoride-phosphoric acid complex. The same reaction conditions as above were used (25–78° C./35 min.; 78–82° C./4 hours). The following products were recovered:

| Recovered | Grams | Gram-moles |
|---|---|---|
| Thiophenol | 64.1 | 0.582 |
| t-Butyl phenyl sulfide | 8.8 | 0.053 |
| p-t-Butylthiophenol | 125.0 | 0.750 |
| t-Butyl p-t-butylphenyl sulfide | 16.6 | 0.075 |
| Residue and others | 1.0 | |
| Losses, residue and others, 4.0%. | | |

The p-t-butylthiophenol was recovered in a yield of 79 percent based on a 95 percent conversion of the starting sulfide.

The catalyst of this invention is an equimolar reaction product of boron trifluoride and phosphoric acid, preferably using 100 percent phosphoric acid as reactant material. When boron trifluoride alone was used as a ring alkylating catalyst for thiophenols, far lower yields were obtained. When phosphoric acid was used as a ring-alkylating catalyst, no ring alkylation occurred. Only the combination of these two catalysts in the form of a boron trifluoride-phosphoric acid complex yields the superior results obtained. When boron trifluoride-ethyl ether complex was used as a catalyst, no ring alkylation occurred.

The following example illustrates the results obtained using gaseous boron trifluoride as catalyst.

Example 9
t-BUTYLATION OF o-THIOCRESOL USING BF₃ AS CATALYST o-Thiocresol was reacted with isobutylene at atmospheric pressure at a temperature of 100° C. for a period of two hours, boron trifluoride being bubbled through the reaction mixture. 4-t-butyl-o-thiocresol was obtained in low yield.

o-Thiocresol was also butylated at greater than atmospheric pressure. Into a 300-ml. rocking type bomb was charged 107 grams of o-thiocresol, 54 grams of isobutylene, and 10 grams of boron trifluoride catalyst. After shaking at room temperature, the pressure was 175 pounds per square inch gage. The bomb was then heated to 80° C. at a pressure of 325 pounds per square inch gage and held at 80° C. for six hours. The bomb was then cooled to room temperature overnight, under pressure, and the reaction products were removed and extracted with caustic. The caustic solution was neutralized, toluene was added, and water present was removed by azeotropic distillation. The recovered material was then fractionally distilled in a ¾-inch diameter Vigreaux column. Recovery of o-thiocresol was 31 grams, or 29 percent based on the o-thiocresol charged. The recovery of the 4-t-butyl-o-thiocresol was 60 grams, or 38 percent based on the o-thiocresol charged. The molar yield based on converted material was 54.4 percent.

By comparison, for a typical run using the BF₃—H₃PO₄ catalyst (run 3, Table III), a 99.3 percent conversion of o-thiocresol was obtained, with a molar yield based on converted material of 67.0 percent.

The following example illustrates the results obtained when phosphoric acid is used as catalyst.

Example 10
PHOSPHORIC ACID CATALYSIS OF THIOPHENOL

To a reaction vessel was charged 550 grams (5 moles) of thiophenol and 224 grams (4 moles) of isobutylene, giving a molar ratio of isobutylene to thiophenol of 0.8. The catalyst used was 85 percent phosphoric acid in a concentration of 5.3 percent by weight of thiophenol. The isobutylene was added to the reaction mixture at a temperature between 19 and 80° C. for two hours, and then the reaction was conducted at 80° C. for 5 hours. Of the thiophenol charged, 44 percent was converted. The product yield (mole percent based on converted thiophenol) was 0.3 percent of 4-t-butylthiophenol and 90 percent of t-butylphenyl sulfide. Thus substantially no ring alkylation occurred.

Obviously many modifications and variations of the invention, hereinbefore set forth, may be made without departing from the spirit and scope thereof, which are primarily directed to the direct alkylation of an alkylatable thiophenol in the para position under alkylating conditions in the presence of boron trifluoride-phosphoric acid complex as catalyst. The examples given, therefore, should be considered only illustrative of the invention, its scope being determined in accordance with the objects thereof and the appended claims.

I claim:

1. The process of substituting the hydrogen atom in the para position of a thiophenol by a tertiary alkyl group which comprises alkylating an alkylatable thiophenol containing hydrogen atoms in meta and para positions with a monoolefinic hydrocarbon alkylating agent, in which the alkyl substituent formed is a tertiary alkyl group, at ring alkylating conditions in the presence of boron trifluoride-phosphoric acid complex as catalyst so that there occurs substantial substitution by the tertiary alkyl group in the para position in additon to S-alkylation.

2. The process for preparing para-alkyl thiophenols which comprises alkylating an alkylatable thiophenol containing hydrogen atoms in meta and para positions with a monoolefinic hydrocarbon containing from 4 to 12 carbon atoms, and in which the alkyl substituent formed is a tertiary alkyl group, at ring alkylating conditions in the presence of boron trifluoride-phosphoric acid complex as catalyst so that there occurs substantial substitution by the tertiary alkyl group in the para position.

3. The process for preparing para-alkyl thiophenols which comprises alkylating a thiophenol selected from the class consisting of thiophenol and ortho-lower alkyl-substituted thiophenols with a monoolefinic hydrocarbon containing from 4 to 12 carbon atoms, and in which the alkyl substituent formed is a tertiary alkyl group, at ring alkylating conditions in the presence of boron trifluoride-phosphoric acid complex as catalyst so that there occurs substantial substitution by the tertiary alkyl group in the para position.

4. The process according to claim 3 wherein said catalyst is a substantially equimolar reaction product of boron trifluoride and 100 percent phosphoric acid.

5. The process for preparing para-t-butyl thiophenols which comprises reacting a thiophenol containing hydrogen atoms in meta and para positions with isobutylene in the presence of boron trifluoride-phosphoric acid complex as catalyst so that substantial carbon t-butylation in the para position occurs.

6. The process for preparing para-t-butylthiophenol which comprises reacting thiophenol with isobutylene in the presence of boron trifluoride-phosphoric acid complex as catalyst so that substantial carbon t-butylation in the para position occurs.

7. The process for preparing a para-alkylated thiophenol in substantial yield by direct alkylation of an alkylatable thiophenol which comprises admixing one part by weight of an alkylatable thiophenol selected from the class consisting of thiophenol and ortho-lower alkyl-substituted thiophenols, from 0.75 to 1 part by weight of a monoolefinic hydrocarbon containing from 4 to 12 carbon atoms and in which the alkyl substituent formed is a tertiary alkyl group, and from 2 to 25 percent by weight, based on the thiophenol, of boron trifluoride-phosphoric acid complex as catalyst, heating the admixture to a temperature within the range of 75–100° C. for one to three hours so that there occurs substantial substitution by the tertiary alkyl group in the para position of said thiophenol, and recovering the para-t-alkyl thiophenol from the mixture in substantial yield based on said thiophenol.

8. The process for preparing a para-alkylated thiophenol in substantial yield by direct alkylation of an alkylatable thiophenol which comprises admixing one part by weight of an alkylatable thiophenol selected from the class consisting of thiophenol and thiocresol containing between 10 and 100 percent by weight of o-thiocresol, from 0.75 to 1 part by weight of a monoolefinic hydrocarbon containing from 4 to 12 carbon atoms and in which the alkyl substituent formed is a tertiary alkyl group, and from 8 to 12 percent by weight of boron trifluoride-phosphoric acid complex based on the weight of said thiophenol, heating the admixture to a temperature within the range of 75–100° C. for one to three hours so that there occurs substantial substitution by the the tertiary alkyl group in the para position of said thiophenol, and recovering the para-t-alkyl thiophenol from the mixture in substantial yield based on said thiophenol.

9. The process according to claim 8 wherein said catalyst is a substantially equimolar reaction product of boron trifluoride and 100 percent phosphoric acid.

10. The process of substituting the hydrogen atom in the para position of a thiophenol by a tertiary alkyl group and obtaining substantially all C-alkylate product which comprises reacting a thiophenol containing hydrogen atoms in meta and para positions with a t-alkyl-generating olefinic hydrocarbon containing from 4 to 12 carbon atoms, and in which the alkyl substituent formed is a tertiary alkyl group, effecting said reaction in the presence of boron trifluoride-phosphoric acid complex as catalyst so that the reaction product obtained includes substantial amounts of para-C-alkylate product in addition to S-alkylate, and reacting at least a portion of the S-alkylate product in the presence of said catalyst wherein reacted S-alkylate product containing hydrogen atoms in meta and para positions of the thiophenol ring forms para-C-alkylate product.

11. The process of substituting the hydrogen atom in the para position of a thiophenol by a tertiary alkyl group and obtaining substantially all C-alkylate product which comprises reacting a thiophenol containing hydrogen atoms in meta and para positions with a t-alkyl-generating olefinic hydrocarbon containing from 4 to 12 carbon atoms and in which the alkyl substituent formed is a tertiary alkyl group, effecting said reaction in the presence of boron trifluoride-phosphoric acid complex as catalyst so that the reaction product obtained includes substantial amounts of para-C-alkylate product in addition to S-alkylate, and reacting the S-alkylate product in the presence of said catalyst with additional portions of said thiophenol to form para-C-alkylate product.

12. The process for t-butylating thiophenol to yield p-t-butylthiophenol which comprises reacting thiophenol with isobutylene in the presence of boron trifluoride-phosphoric acid complex as catalyst so that the reaction product obtained includes substantial amounts of p-t-butylthiophenol in addition to sulfide selected from the group consisting of t-butyl phenyl sulfide, t-butyl p-t-butylphenyl sulfide and mixtures thereof, and reacting at least a portion of said sulfide containing t-butyl phenyl sulfide in the presence of said catalyst wherein reacted t-butyl phenyl sulfide forms p-t-butylthiophenol.

13. The process for preparing para-alkyl thiophenols which comprises reacting a t-alkyl aryl sulfide in which the aryl radical contains hydrogen atoms in meta and para positions in the presence of boron trifluoride-phosphoric acid complex as catalyst to produce substantial amounts of a para-C-alkylated thiophenol.

14. The process for preparing para-alkyl thiophenols which comprises reacting a t-alkyl para-alkaryl sulfide with a thiophenol containing hydrogen atoms in meta and para positions in the presence of boron trifluoride-phosphoric acid complex as catalyst to produce substantial amounts of a para-C-alkylated thiophenol.

15. The process for preparing para-t-butylated thiophenols which comprises reacting a t-butyl alkaryl sulfide in which the alkaryl radical is mononuclear and contains hydrogen atoms in meta and para positions in the presence of boron trifluoride-phosphoric acid complex as catalyst to produce substantial amounts of a para-C-t-butylated thiophenol.

16. The process for preparing para-t-butylated thiophenols which comprises reacting a t-butyl alkaryl sulfide in which the alkaryl radical is mononuclear and contains hydrogen atoms in meta and para positions with a thiophenol containing hydrogen atoms in meta and para positions in the presence of boron trifluoride-phosphoric acid complex as catalyst to produce substantial amounts of a para-C-t-butylated thiophenol.

17. The process for preparing para-t-butylated thiophenols which comprises reacting a mononuclear t-butyl p-t-butylaryl sulfide with a mononuclear thiophenol containing hydrogen atoms in meta and para positions in the presence of boron trifluoride-phosphoric acid complex as catalyst to produce substantial amounts of para-C-t-butylated thiophenols.

18. The process for preparing p-t-butylthiophenol from t-butyl phenyl sulfide which comprises reacting t-butyl phenyl sulfide in the presence of boron trifluoride-phosphoric acid complex as catalyst to produce substantial amounts of p-t-butylthiophenol.

19. The process for preparing 4-t-butyl-o-thiocresol by the alkylation of mixed thiocresols containing at least 10 percent by weight of o-thiocresol which comprises reacting isobutylene and o-thiocresol in a molar ratio of between 0.70:1 and 1:1 respectively at a temperature between 75 and 100° C. for one to three hours in the presence of a substantially equimolar reaction product of boron trifluoride and 100 percent phosphoric acid as catalyst whereby at least 90 percent of the o-thiocresol is butylated, and recovering from the reaction mixture 4-t-butyl-o-thiocresol in a yield of at least 70 percent based on butylated o-thiocresol.

References Cited in the file of this patent

UNITED STATES PATENTS

| | | |
|---|---|---|
| 2,686,815 | Nickels | Aug. 17, 1954 |
| 2,739,172 | Peters | Mar. 20, 1956 |
| 2,800,451 | Mottern et al. | July 23, 1957 |

UNITED STATES PATENT OFFICE
CERTIFICATE OF CORRECTION

Patent No. 3,076,851                                February 5, 1963

Martin B. Neuworth

It is hereby certified that error appears in the above numbered patent requiring correction and that the said Letters Patent should read as corrected below.

Column 3, line 18, for "The" read -- This --; column 3, line 55, for "liability" read -- lability --; column 6, line 62, for "$C(CH_3)_2-CH_2$" read -- $C(CH_3)_2=CH_2$ --; column 9, line 74, for "nonylthiiphenol" read -- nonylthiophenol --.

Signed and sealed this 24th day of September 1963.

(SEAL)
Attest:

ERNEST W. SWIDER                              DAVID L. LADD
Attesting Officer                               Commissioner of Patents